United States Patent [19]
Hirst

[11] Patent Number: 6,018,151
[45] Date of Patent: Jan. 25, 2000

[54] PREDICTIVE FUSING SYSTEM FOR USE IN ELECTROPHOTOGRAPHIC PRINTERS AND COPIERS

[75] Inventor: B. Mark Hirst, Boise, Id.

[73] Assignee: Hewlett-Packard Co., Palo Alto, Calif.

[21] Appl. No.: 09/127,929

[22] Filed: Jul. 31, 1998

[51] Int. Cl.$^7$ .................................................... H05B 1/02
[52] U.S. Cl. ...................... 219/497; 219/492; 219/501; 219/216; 399/330; 399/335
[58] Field of Search .................................... 219/216, 492, 219/494, 497, 501, 505, 508, 481, 388; 399/320, 328, 330–335

[56] References Cited

U.S. PATENT DOCUMENTS

| | | |
|---|---|---|
| 4,161,644 | 7/1979 | Yanagawa et al. ...................... 219/216 |
| 4,374,321 | 2/1983 | Cunningham, Jr. et al. ........... 219/505 |
| 5,700,994 | 12/1997 | Gheer et al. ............................ 219/497 |

Primary Examiner—Mark Paschall
Attorney, Agent, or Firm—Anthony J Baca

[57] ABSTRACT

When the media enters the fuser, the added thermal load causes the fuser temperature to dip. Eventually, the control system compensates for the thermal load and stabilizes the fuser temperature at the desired temperature. Depending on several factors, the dip in fusing temperature may cause a degradation in the fusing process. An improved temperature profile can be achieved by increasing the amount of power supplied to the fusing system a predetermined amount of time before the thermal load enters the fusing system. Similarly, the amount of power supplied to the fusing system is decreased a predetermined amount of time before the thermal load exits the fusing system. The Desired Temperature input to the fuser temperature control system is modified to anticipate changes in thermal loads thereby changing the amount of power supplied to the fusing system.

20 Claims, 6 Drawing Sheets

PREDICTIVE FUSING SYSTEM FOR USE IN ELECTROPHOTOGRAPHIC PRINTERS AND COPIERS

TECHNICAL FIELD

This invention relates generally to power control systems and more particular to a method and apparatus for controlling the amount of power supplied to a resistive heating element.

BACKGROUND OF THE INVENTION

Starting in approximately 1984 low cost personal laser printers became available. All dry electrophotographic copiers and printers develop an image utilizing a dry toner. The typical toner is composed of styrene acrylic resin, a pigment-typically carbon black, and a charge control dye to endow the toner with the desired tribocharging properties for developing a latent electrostatic image. Styrene acrylic resin is a thermoplastic which can be melted and fused to the desired medium, typically paper.

The typical fusing system in an electrophotographic printer or copier is composed of two heated platen rollers which, when print media with a developed image pass between them, melt the toner and through pressure physically fuse the molten thermal plastic to the medium. Heating is usually accomplished by placing a high power tungsten filament quartz lamp inside the hollow platen roller.

Presently, most printer and copier fusing systems and their temperature control systems are not designed to compensate for differing media types or changes in thermal loading as a result of media passing through the printer or copier. The typical fusing system is designed with a heating element capable of providing enough heat to deal with all foreseen media with little or no concern to the resulting poor power quality that results. Some relatively new printers do utilize optical sensors to differentiate between paper and overhead transparencies. These additional sensors, which are being added to the printing mechanisms in order to improve image quality, can also be utilized by the fuser control systems to improve temperature regulation as well as improve the power quality of the overall printing system.

There are numerous reasons to intelligently control an electrophotographic printer or copier (herein referred to collectively as printers) fusing system in a much more aggressive manner. First, intelligent control can result in a universal fuser that can be shipped to any commercial market worldwide regardless of the power system. The universal fuser is a fusing system which can be connected to any low voltage public power system worldwide. Second, a flicker free universal fuser has the attractive benefit of requiring a single part for both manufacture and field service replacement. As used here, flicker is the visual perception of ambient light fluctuations within the home or office due to large transient power loads inducing voltage changes on the low voltage public power distribution system. The manufacturer is relieved of the burden of manufacturing 110 VAC and 220 VAC printers. The need to stock two types of service parts is eliminated, and product distribution centers now have one product that can be shipped to any country in the world without any reconfiguration requirements. There are reduced logistical burdens for sales, distribution and manufacture scheduling. As can be expected there is a large financial advantage to be gained by producing only a single version of a product for worldwide consumption.

For a dry electrophotographic fusing system to operate worldwide it must be able to operate satisfactorily on AC power systems providing from 90 Vrms to 240 Vrms at frequencies of 50 Hz to 60 Hz. The fusing system must heat up from ambient room temperature to operating temperature as quickly as possible while exhibiting extremely low flicker as its power consumption level changes. The fusing system, when combined with the balance of the electrophotographic printer power electronics, must meet International Electrical Commission (IEC) regulations IEC 555-2 and IEC 555-3 for current harmonics and flicker. The printer must pass Federal Communications Commission (FCC) class B regulations for power line conducted emissions and radiated emissions. In addition, the printer must pass CISPR B requirements for power line conducted emissions and radiated emissions. Finally, the printer must not suffer from excessive acoustic multi-tone or single tone emissions in the human auditory range in the office environment. The fusing system must be capable of switching into a power down or power off mode for energy savings as suggested by the EPA Energy Star Program. The absolute cost of any additional electronics is limited to no more than the cost benefit of not stocking multiple 110 VAC and 220 VAC models.

U.S. Pat. No. 5,483,149 to Barrett (herein referred to as Barrett) shows that a universal fuser may be obtained through the use of a modified integral half cycle (IHC) power controller but without solving the flicker problem at high power. The method taught by Barrett has been shown to suffer some flicker problems as well as placing current sub-harmonics on the AC power system. Currently no regulation exists regarding AC current sub-harmonic content.

Other methods such as phase control, in which a triac's conduction angle is ramped up relatively slowly, have proven to yield a universal fusing system which meets IEC 555-3 specifications. In U.S. Pat. No. 4,928,055 to Kaieda et al. (herein referred to as Kaieda) a fuser power control system based on phase delay gated triac control of an AC heating system is taught.

Prior to the present invention, most printers relied on the large thermal mass of the fusing system to average out the temperature changes induced by the media as it passes through the fusing system. Use of a large thermal mass allows a simple proportional temperature controller to maintain the average temperature of the fuser near the desired temperature. However, a large thermal mass takes longer to heat up, which increases the time for first page out when first powering up the printer or after exiting a power save mode. Additionally, the large thermal mass increases the physical weight and cost of the printer and the replacement parts. Finally, the large thermal mass also experiences a large pure time delay which causes temperature controller to oscillate.

Most commercially implemented fuser temperature controllers utilized triac based power controllers controlled by an oscillating proportional temperature controller. These systems generate high levels of flicker. The oscillatory nature of the temperature control systems coupled with the large phase lag in the system induced large temperature swings in the fuser temperature as media traveled through the fuser platens. These systems tended to run the fuser system at a very high temperature in order to attain adequate fusing of toner to heavy paper media at high relative humidity. When there prior systems where oscillating the power to the fuser certain portions of the paper media would receive not enough energy to completely fuse the toner to the paper.

The typical temperature controller drives a triac based power controller. The triac based power controller provides ease of implementation at a low cost. The triac based system may be controlled by an integral half cycle controller (IHC) in which a number of half cycles of AC power are supplied to the fusing system and a number of half cycles of no power are supplied to the fuser. The ratio of the number of power cycles to the total of the power cycles plus the non-power cycles is called the duty cycle, or duty ratio, of the IHC controller. A triac based system may also be controlled by a phase control system which allows the triac to supply power to the fuser for discrete portions of the AC half cycle. The portion of the AC cycle in which the triac is conducting is known as the conduction angle.

SUMMARY OF THE INVENTION

The present invention provides an apparatus and a method for controlling temperature of a heating element in an imaging device. The apparatus has a control system that maintains the temperature of the heating element at a desired temperature. There is a timer signal indicative of a change in a thermal load of the heating element. A switch is connected to the control system and arranged to receive the timer signal, the delta temperature and the desired temperature. Upon receiving the timer signal, the switch modifies the desired temperature by the delta temperature. The apparatus may also include an environment sensor that is used to modify the delta temperature in accordance with environment sensor. There may also be provided a plurality of delta temperatures where each plurality of delta temperature corresponds to a different potential thermal load. A selector outputs one of the plurality of delta temperature as the delta temperature.

The method for controlling temperature of a heating element in an imaging device requires setting a desired temperature. A delta temperature is selected, which is used to modify the desired temperature upon receiving a timing signal. The temperature of the heating element is adjusted to the modified, desired temperature. The method may also monitor the temperature of the heating element to either adjust the delta temperature or determine an appropriate delta temperature for an unknown thermal load.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

The present invention is not limited to a specific embodiment illustrated herein. An exemplary control system for controlling the temperature of the fusing system is presented. This control system utilizes the knowledge of the heating characteristics of the fuser filament along with the knowledge that the human eye is most sensitive to temporal changes near the 8 Hz to 10 Hz rate as well as the concept of shape factors to control the rate at which power is applied to the filament to bring the fusing system up to operating temperature. From the study of the electrical and thermal characteristics of the filament it is known that the filament resistance exhibits a thermal time constant of 330 mS while heating. Also, from the summary of flicker regulations it is known that the best reduction in flicker is for the case in which a ramp voltage change is implemented with a ramp time of at least 1 second.

Figure 1:
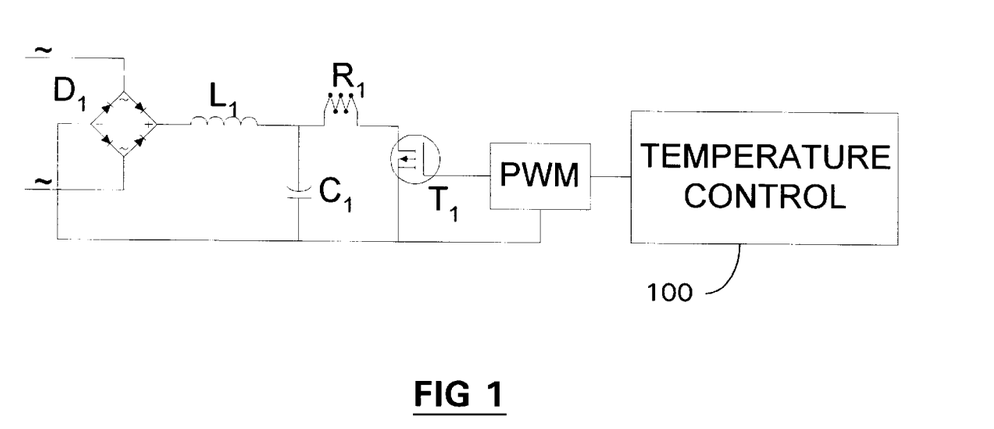
FIG. 1 shows a high level diagram of a fusing system incorporating the present invention.

The temperature control system 100 is shown in high level in FIG. 1. It may be designed with either traditional control techniques and translated into the discrete time domain or it can be designed completely in the discrete time domain. The control system is implemented in a conventional feedback control structure such as a classic proportional-integral, PI, controller. Adaptive control is an additional avenue open to the temperature control system and is a structure that also fits a conventional feedback control system.

Figure 2:
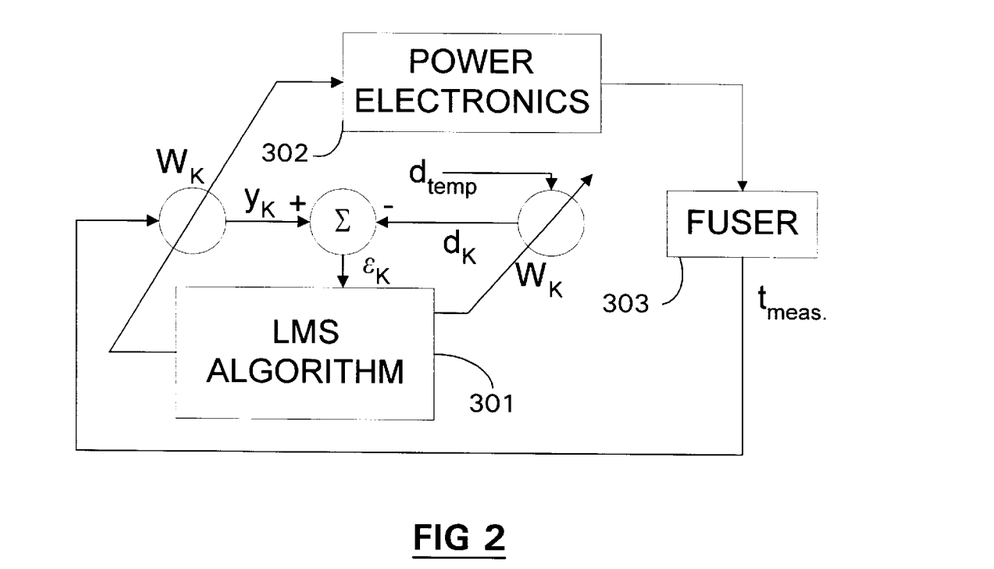
FIG. 2 shows the topology of an adaptive system for temperature control.

The conventional foundation for feedback control is presented in block form in FIG. 2 where the input to the system is the desired fuser temperature, $d_{temp}$, and the feedback quantity is the measured fuser temperature, $t_{meas}$. The temperature error signal is generated by controller 301 whose output, $W_k$, directly controls the duty cycle of the pulse width modulator in the power electronics block 302.

The controller 301 of FIG. 2 may be of the proportional, PI, PID or adaptive type and could contain detailed models of the dynamics of the fusing system. The power electronics 302 can be considered a linear power amplifier which possesses fast dynamics. Fuser 303 on the other hand will possess considerably slower dynamics and it may prove necessary to include these dynamics in the design of temperature controller for either performance or stability reasons.

The preferred embodiment of the present invention uses an adaptive control system based on adaptive linear combiner using an LMS (Least Mean Square) type of algorithm such as taught by Widrow, B. & Stems, S., "Adaptive Signal Processing", ISBN 0-13-004029-01 (1985) (herein incorporated by reference). Adaptive control systems are very attractive in that they can be implemented with very little knowledge of the system to be controlled as they will adapt themselves to the problem. Adaptive control systems can be easily modified for fast or slow adaptation and can thus, adapt quickly to bring a system under control and then switch to slow adaptation for fine control around a desired set point.

The preferred embodiment uses a one weight adaptive structure and an LMS type algorithm. A simple one weight approach has many advantages with the greatest being the ability to replace the existing control system without undue processor overhead. This allows for the highest probability of implementation in a mass produced printer or copier.

The multiplication of the corrected measured temperature by the adaptive weight vector was removed and the weight vector was instead supplied directly to the pulse width modulator. The output of the adaptive linear combiner, $y_k$, is now just the corrected positive temperature coefficient fuser temperature measurement.

The instantaneous error signal, $\epsilon_k$, for this modified adaptive system is now of the form $$\epsilon_k = y_k - d_k \qquad \text{eq. 1}$$

Fuser 303 also exhibits a large amount of pure time delay. With fuser 302 exhibiting pure time delay (i.e., phase lag) for a given time after a change in its input power, the temperature and hence the error signal of the control system remains constant. While the error is constant the next adaptive weight (Wk+1), which is linearly controlling the average power delivered to the fuser, increase or decrease linearly. The phase lag causes the temperature controller to oscillate, similar to a proportional controller with high gain.

One of the criteria that is used to compare competing laser printers and copiers against one another is the time required for the fusing mechanism to heat up from the "cold" state to the temperatures necessary for proper fusing. Due to the thermal mass of the fuser platens a large amount of energy is necessary to bring the fusing system up to operating temperature as fast as is reasonably possible. There are also limits to the available power levels that can be drawn from the household or office low voltage distribution system with the maximum available power level for worldwide use being approximately 1200 watts.

After fuser 302 has been brought up to operating temperature the amount of energy necessary for maintaining temperature and providing enough energy for proper fusing of toner to the print media is greatly diminished. Therefore, maximum power supplied to fuser 302 can be reduced. Of course the average power required changes greatly depending upon the thermal load of various media such differing paper weights and sizes as well as different media types such as overhead transparencies. The average power levels required for proper fusing also change as the amount of moisture in the paper varies with the changing relative humidity.

The preferred embodiment fusing system has at least four discrete modes of operation: warm-up, operation, idle, and power-save. During the warm-up mode of operation the maximum available power is supplied to the fuser so that it may be warmed from some ambient temperature to operating temperatures as quickly as possible. During operating mode the power levels supplied to the fuser oscillate due to the transient power loads of printed media passing through the fusing system. In idle mode the target temperature of the fusing system is reduced and media loads are no longer passing through the fusing system. The temperature controller is still oscillating but the average power required to maintain idle temperatures in the fusing system is typically reduced by a factor of 10 over the active power levels. When the printer enters the power-save mode the power to the fusing system is completely turned off to minimize the power required by the printer.

Figure 3:
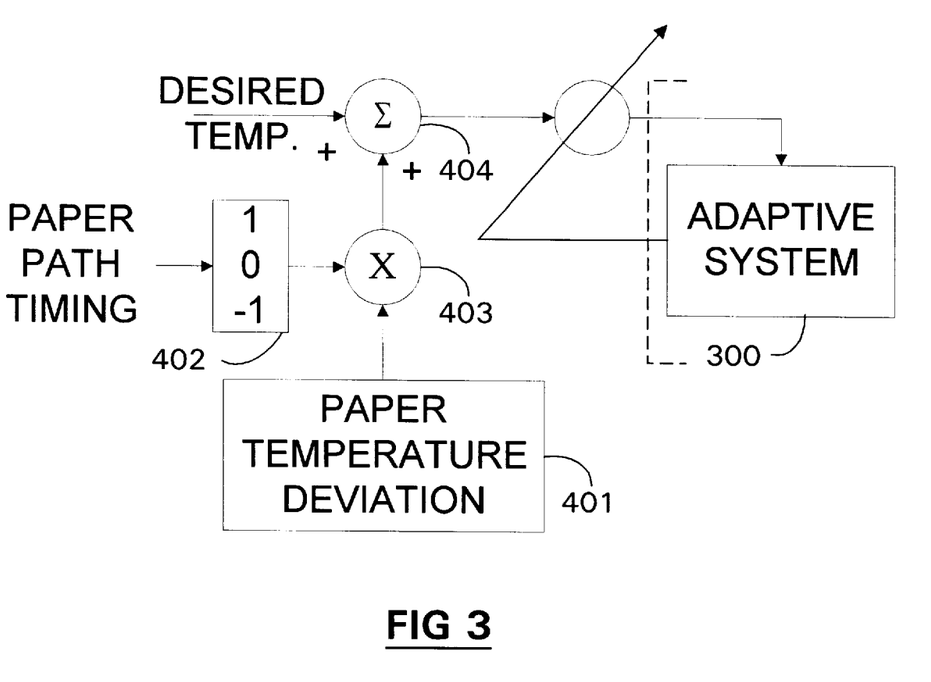
FIG. 3 shows addition to the adaptive system to predict impending thermal load changes.

Referring now to FIG. 3 adaptive system of FIG. 2 is shown as block 300. Using the present invention, the Desired Temperature input to adaptive system 300 is modified to anticipate upcoming thermal loads. The fuser will experience fluctuations in the temperature as media passes through the fuser. Referring to FIG. 4d, where the fuser temperature with and without predictive control is shown. Without feed forward, predictive control the fuser temperature follows line 501. In particular, when the media enters the fuser, the added thermal load causes the fuser temperature to dip. Eventually, the adaptive system 300 compensates for the thermal load and stabilizes the fuser temperature at the desired temperature. Depending on several factors, the dip in fusing temperature may cause a degradation in the fusing process. By using the feed forward, predictive control the fuser temperature is flatter as shown by line 502.

Figure 4:
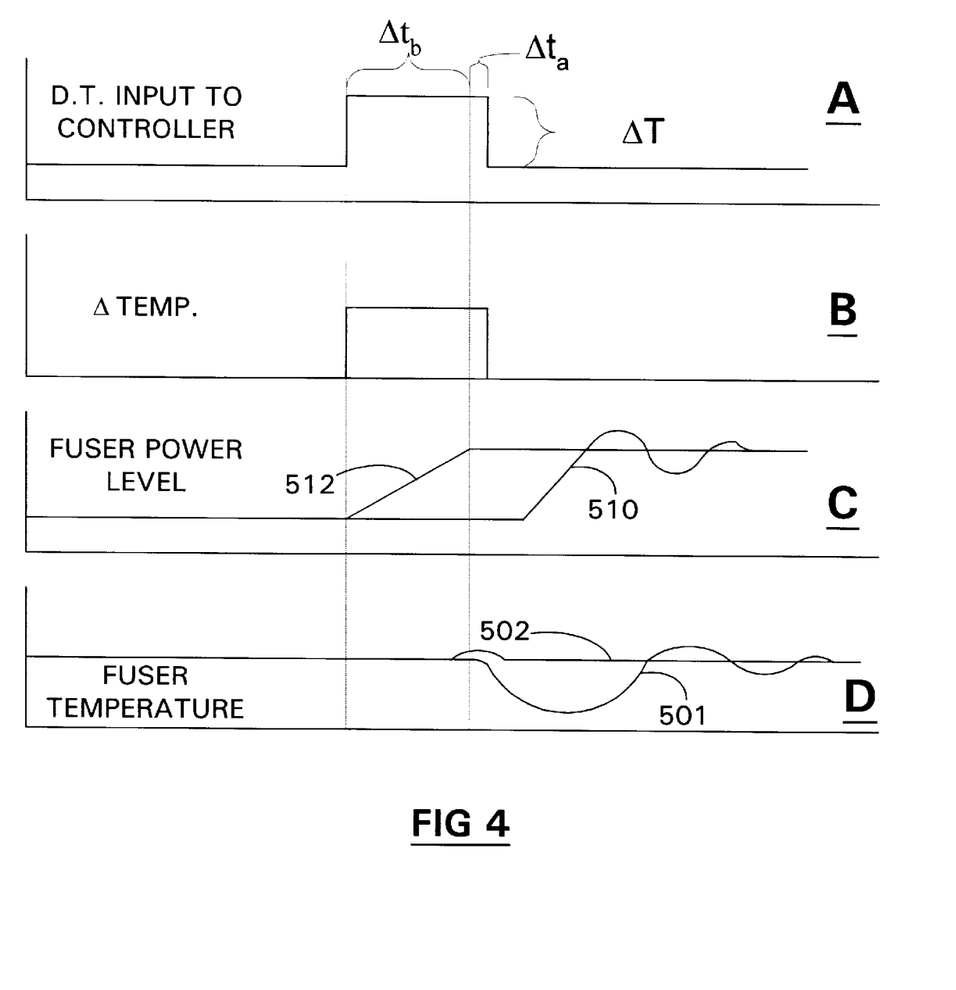
FIG. 4A is a timing diagram showing the desired fuser temperature as the paper enter the fuser system.
FIG. 4B is a timing diagram showing the delta temperature.
FIG. 4C is a timing diagram showing the fuser power level with and without predictive control.
FIG. 4D is a timing diagram showing the fuser temperature with and without predictive control.

With the understanding that the fusing system exhibits a large phase delay as described above, the temperature profile 502 of FIG. 4d is achieved by increasing the amount of power supplied to the fusing system a predetermined amount of time before ($\Delta t_b$ in FIG. 5a) the thermal load enters the fusing system. In a normal fusing system, the amount of power supplied to the fusing system is graphically shown by line 510 of FIG. 4. As shown, sometime after the media enters the fusing system, the adaptive system 300, in response to a drop in fusing temperature, increases the amount of power supplied to the fusing system. Eventually, adaptive system 300 stabilizes the amount of the power supplied to the fusing system at the new power level. With the feed forward, predictive control approach, power to the fusing system is increased before the media enters the fusing system. Line 512 graphically represents the increase in power supplied to the fusing system. As can be seen, the power is increased before the media enters the fusing system. However, because of the thermal mass of the fusing system, the temperature 502 (FIG. 4d) does not start to increase immediately.

While it is possible to modify the Adaptive System 300 to anticipate the upcoming thermal load change, the same result may be accomplished by altering the desired temperature input to the adaptive system 300 as shown in FIG. 3. In particular, a predetermined amount of time before the media enters the fusing system the Paper Path Timing signal indicates to switch 402 that the desired temperature must be modified. Switch 402 changes from outputting a zero (0) to outputting a one (1). Multiplier 403 then multiplies the Paper Temperature Deviation 401 ($\Delta T$) by one (1), the result being $\Delta T$. Adder 404 then adds $\Delta T$ to the original Desired Temperature. The temperature input to Adaptive System 300 is graphically shown in FIG. 4a. At $\Delta t_b$ before the media enters the fusing system, the temperature input to Adaptive System 300 is increased by $\Delta T$. Similarly, $\Delta t_a$ after the media enters the fusing system the temperature input to Adaptive System 300 is returned to its original Desired Temperature by changing Switch 402 to zero (0).

Figure 5:
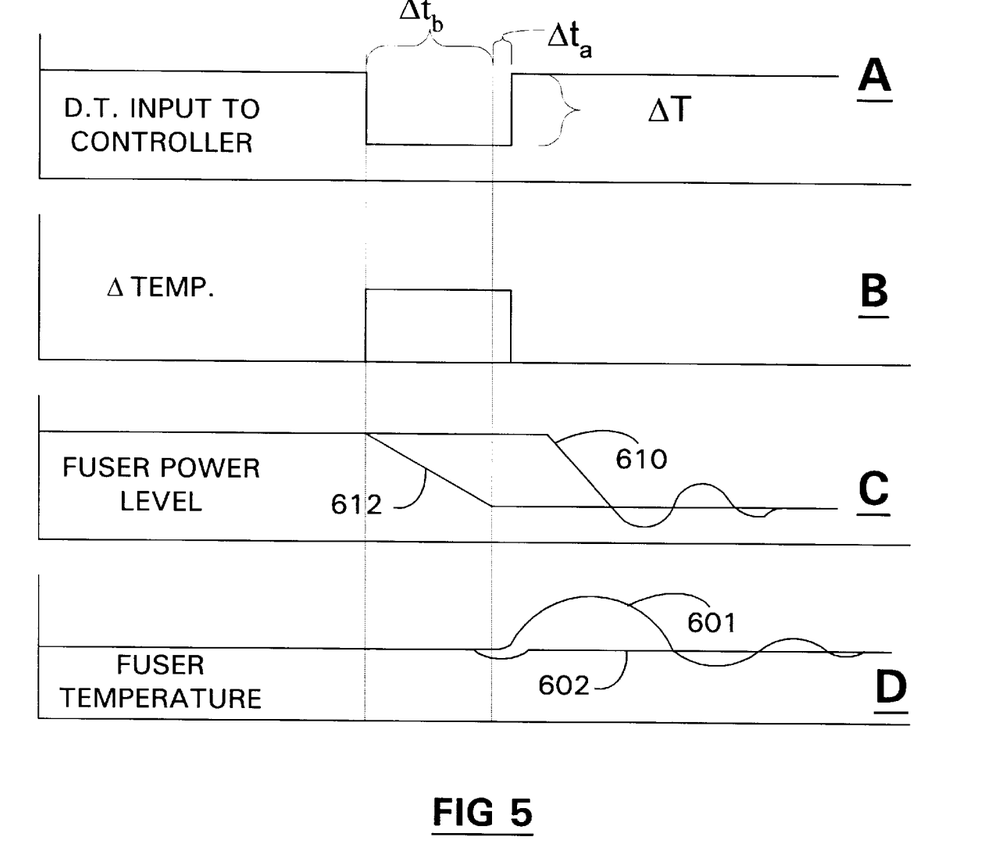
FIG. 5A is a timing diagram showing the desired fuser temperature as the paper exits the fuser system
FIG. 5B is a timing diagram showing the delta temperature.
FIG. 5C is a timing diagram showing the fuser power level with and without predictive control.
FIG. 5D is a timing diagram showing the fuser temperature with and without predictive control.

Referring now to FIG. 5 and FIG. 3, a similar phenomena occurs when the media exits the fusing system. In FIG. 5d fuser temperature with 602 and without 601 predictive control is shown. Without feed forward, predictive control the fuser temperature follows line 601. In particular, when the media exits the fuser, the reduced thermal load causes the fuser temperature to rise. Eventually, the adaptive system 300 compensates for the new thermal load and stabilizes the fuser temperature at the desired temperature. Depending on several factors, the increase in fusing temperature may damage the fusing process. By using the feed forward, predictive control the fuser temperature is flatter as shown by line 602, which that the temperature in the fusing system is relatively constant.

Again, with the understanding that the fusing system exhibits a large phase delay as described above, the temperature profile 602 of FIG. 5d is achieved by decreasing the amount of power supplied to the fusing system a predetermined amount of time before the thermal load exits the fusing system. In a normal fusing system, the amount of power supplied to the fusing system is graphically shown by line 610 of FIG. 5. As shown, sometime after the media exits the fusing system, the adaptive system 300, in response to a rise in fusing temperature, decreases the amount of power supplied to the fusing system. Eventually, adaptive system 300 stabilizes the amount of the power supplied to the fusing system at the new power level. With the feed forward, predictive control approach, power to the fusing system is decreased before the media exits the fusing system. Line 612 graphically represents the decrease in power supplied to the fusing system. As can be seen, the power is decreased before the media starts to exit the fusing system. However, because of the thermal mass of the fusing system, the temperature 602 (FIG. 5d) does not start to decrease immediately.

Referring again to FIG. 3, a predetermined amount of time before the media exits the fusing system the Paper Path Timing signal indicates to switch 402 that the desired temperature must be modified. Switch 402 changes from outputting a zero (0) to outputting a minus one (–1). Multiplier 403 then multiplies the Paper Temperature Deviation 401 ($\Delta T$) by minus one (–1), the result being $-\Delta T$. Adder 404 then adds $-\Delta T$ to the original Desired Temperature. The temperature input to Adaptive System 300 is graphically shown in FIG. 5a. At $\Delta t_b$ before the media exits the fusing system, the temperature input to Adaptive System 300 is decreased by $-\Delta T$. Similarly, $\Delta t_a$ after the media exits the fusing system the temperature input to Adaptive System 300 is returned to its original Desired Temperature by changing Switch 402 to zero (0).

Figure 6:
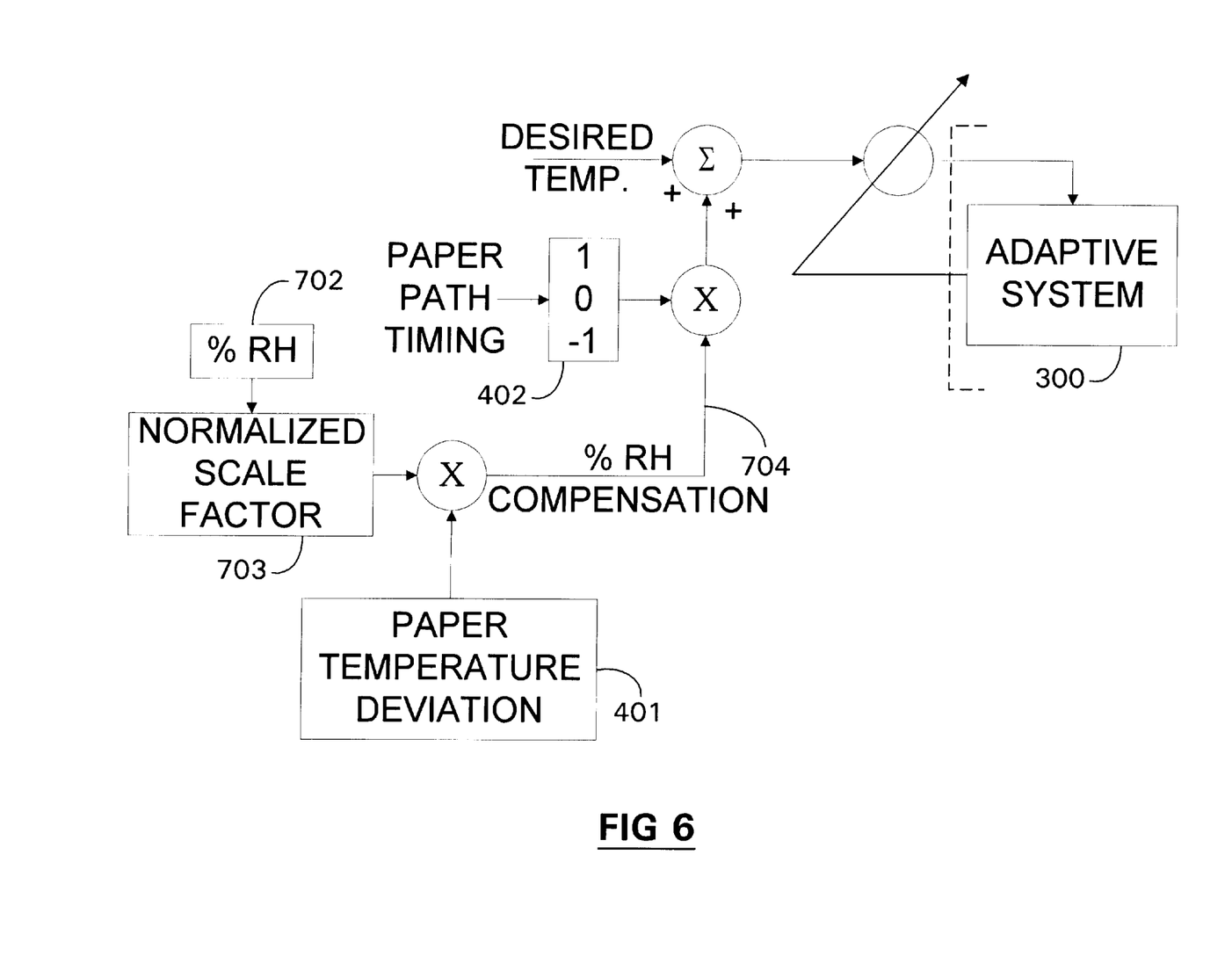
FIG. 6 is a block diagram showing the adaptive system to predict impending thermal load changes and compensation for %RH.

Other things may effect change the optimum fusing temperature. For example, the percent relative humidity may require a change in the temperature. Referring to FIG. 6, a block diagram showing percent relative humidity (%RH) compensation. Sensor 702 provide information about the ambient %RH, which is adjusted by normalized Scale Factor 703. Paper Temperature Deviation 401 ($\Delta T$) is modified by the output of 703 to create the %RH Compensation 704. This %RH Compensation is then used to increase or decrease the Desired Temperature as described above. Other environmental conditions might include ambient temperature; altitude, age of fusing device or line voltage.

Figure 8:
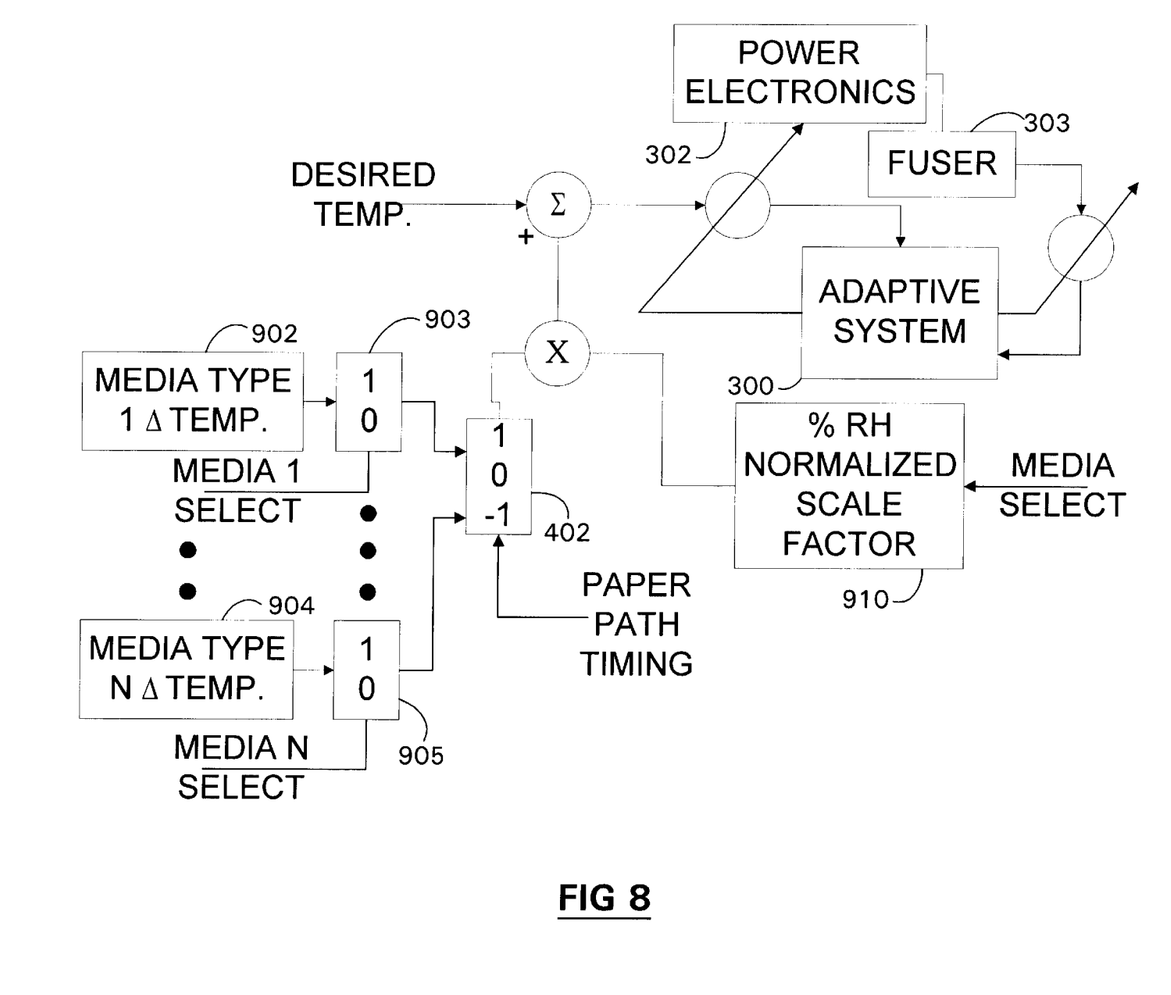
FIG. 8 is a block diagram showing the adaptive system to predict different impending thermal load changes and compensation for %RH.

Many printing system are designed to use multiple types of media. For example, media may be transparency or paper, the paper may vary in weight. By using the diagram of FIG. 8, any number of media types can be compensated. FIG. 8 adds a Media Type Delta Temperature ($\Delta T$) and Switch (902-905) for each type of media. When Media N is selected, switch 905 changes from a zero (0) to a one (1). thereby allowing the Media Type Delta Temperature from 904 to pass to switch 402. Additionally, Media Select indicates to %RH Normalized Scale Factor 910 which media is selected so that $\Delta T$ can be %RH corrected for that given media. At the appropriate time, Paper Path Timing signal causes switch 402 to operate as described above.

Figure 7:
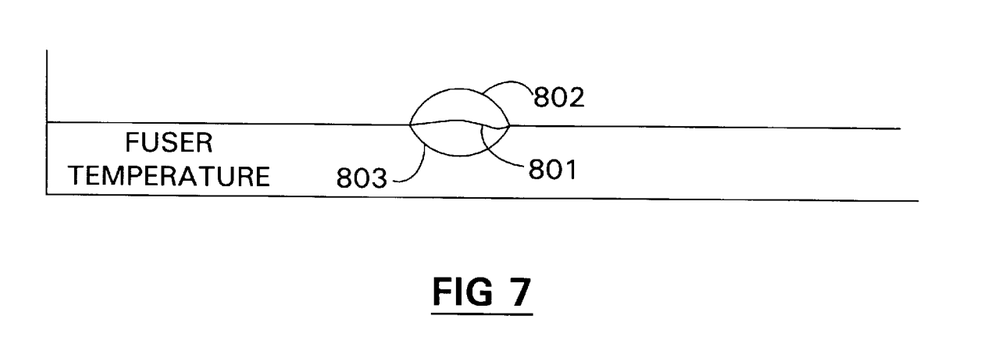
FIG. 7 is an exaggerated waveform diagram showing the fuser temperature change as a result of differing thermal loads.

When the user changes the media, the fusing system must determine the Media Type Delta Temperature for the new media. A printing system could use several methods to determine the Media Type Delta Temperature for the new media. For example, the user could enter information about the paper, such information may include the weight, manufacture, size, or identification code. A more desirable approach is to have the printer automatically determine the Media Type Delta Temperature. With the aid of FIG. 7, as the media enters the fuser, if the fuser temperature follows line 801, then standard Paper Temperature Deviation ($\Delta T$) should be used. If the fuser temperature follows line 802, then the media is lighter than the normal media and Media Type Delta Temperature should be less than the standard Paper Temperature Deviation ($\Delta T$). Similarly, If the fuser temperature follows line 803, then the media is heavier than the normal media and Media Type Delta Temperature should be greater than the standard Paper Temperature Deviation ($\Delta T$). The above process may be used as every page is fed through the fusing system thereby allowing the system to "fine tune" the Media Type Delta Temperature.

Although the preferred embodiment of the invention has been illustrated, and that form described, it is readily apparent to those skilled in the art that various modifications may be made therein without departing from the spirit of the invention or from the scope of the appended claims.

The invention has been described using an adaptive control system, however, any type of control system, such as IHC, phase, PID or others known in the art, can be used with the present invention.

Fuser temperature control systems in most electrophotographic devices utilize a triac based power electronics (302). Such a triac based system could use the more advanced predictive control system, however, excessive flicker may be a problem when using the present invention. The circuit of FIG. 1 allows the average power dissipated per half cycle to be precisely controlled and with appropriate control algorithms, flicker is also virtually eliminated.

The block diagrams of FIGS. 3, 6 and 8 all show separate functional blocks. One skilled in the art understands that many of these functions can be created either with hardware or software or a combination. For example, the adaptive system (300), (or many other types of control systems) the switches (402, 903 and 905) %RH Normalized Scale Factor (703 and 910) arithmetic functions (403 and 404) could be implemented in software or hardware.

The above description has shown the desired fuser temperature being increased or decrease by the same Paper Temperature Deviation ($\Delta T$). This limitation is not intended to limit the scope of the appended claims, it is intended only for aiding the reader in understanding the present invention. It should be understood that the $\Delta T$ used at $\Delta t_b$ may be different than the $\Delta T$ used at $\Delta t_a$. Similarly, the $\Delta T$ used when the media approaches the fusing system may be different than the $\Delta T$ used when the media starts to exit the fusing system.

What is claimed is:

1. An apparatus for controlling temperature of a heating element in an imaging device, said apparatus comprising:
   a control system that maintains the temperature of the heating element at a desired temperature;
   a timer signal indicative of a change in a thermal load of the heating element;
   a delta temperature; and
   a switch connected to the control system and arranged to receive the timer signal and the delta temperature and the desired temperature, upon receiving the timer signal, the switch modifies the desired temperature by the delta temperature.

2. The apparatus as claimed in claim 1 wherein the switch adds the delta temperature to the desired temperature if the timer signal indicates that the thermal load is an increased load.

3. The apparatus as claimed in claim 1 wherein the switch subtracts the delta temperature from the desired temperature if the timer signal indicates that the thermal load is a decreased load.

4. The apparatus as claimed in claim 1 further comprising:

a environment sensor; and a modifier connected to the environment sensor and the switch and arranged to receive the delta temperature, the modifier modifies the delta temperature in accordance with environment sensor.

5. The apparatus as claimed in claim 4 where the environment sensor senses ambient relative humidity.

6. The apparatus as claimed in claim 1 further comprising:

a plurality of delta temperatures;

a selection indicator a selector arranged to receive the plurality of delta temperatures and the selection indicator, the selector, under control of the selection indicator, outputs one of the plurality of delta temperature as the delta temperature.

7. A method for controlling temperature of a heating element in an imaging device, said method apparatus comprising the steps of:

setting a desired temperature;

selecting a delta temperature;

modifying the desired temperature by the delta temperature amount upon receiving a timing signal; and adjusting the temperature of the heating element to the modified desired temperature.

8. The method of claim 7 the step of selecting further comprising the steps of:

detecting a type of media being used in the imaging device;

preselecting the delta temperature from a plurality of delta temperatures, the delta temperature selected be related to the type of media detected.

9. The method of claim 7 the step of modifying further comprising the steps of:

sensing an environmental condition; and compensating the delta temperature to adjust for the environmental condition.

10. The method of claim 7 the step of modifying further comprising the steps of:

adding the delta temperature to the desired temperature if the timer signal indicates an increased thermal load is approaching the heating element.

11. The method of claim 10 the step of modifying further comprising the step of:

resetting to desired temperature when the timer signal indicates that the increased thermal load is entering the heating element.

12. The method of claim 11 the step of modifying further comprising the steps of:

monitoring the temperature of the heating element while the increased thermal load is entering the heating element; and adjusting the delta temperature.

13. The method of claim 7 the step of modifying further comprising the step of:

subtracting the delta temperature from the desired temperature if the timer signal indicates a decreased thermal load is approaching the heating element.

14. The method of claim 13 the step of modifying further comprising the step of:

resetting to desired temperature when the timer signal indicates that the decreased thermal load is exiting the heating element.

15. The method of claim 14 the step of modifying further comprising the steps of:

monitoring the temperature of the heating element while the decreased thermal load is exiting the heating element; and adjusting the delta temperature.

16. An apparatus for controlling temperature of a fusing system in an electrophotographic printer, said apparatus comprising:

an adaptive control system for maintaining the temperature of the fusing system at a set temperature;

a timer signal indicates when a media is about to enter the fusing system, said timer signal also indicates when a media is about to exit the fusing system; and a switch connected to the adaptive control system and arranged to receive the timer signal and a desired temperature, upon receiving the timer signal, the switch modifies the desired temperature by a delta temperature amount and outputs the result to the adaptive controller as the set temperature.

17. The apparatus of claim 16 wherein the switch adds the delta temperature and desired temperature to create the set temperature when the timer signal indicates that the media is about to enter the fusing system and the switch outputs the desired temperature to create the set temperature when the timer signal indicates that the media has entered the fusing system.

18. The apparatus of claim 16 wherein the switch subtracts the delta temperature from the desired temperature to create the set temperature when the timer signal indicates that the media is about to exit the fusing system and the switch outputs the desired temperature to create the set temperature when the timer signal indicates that the media has exited the fusing system.

19. The apparatus as claimed in claim 16 further comprising:

a environment sensor; and a modifier connected to the environment sensor and the switch and arranged to receive the delta temperature, the modifier modifies the delta temperature in accordance with environment sensor.

20. The apparatus as claimed in claim 16 further comprising:

a plurality of delta temperatures;

a selection indicator a selector arranged to receive the plurality of delta temperatures and the selection indicator, the selector, under control of the selection indicator, outputs one of the plurality of delta temperature as the delta temperature.

* * * * *